Jan. 17, 1967   R. E. MEDD   3,298,162
FORAGE HARVESTER AND CORN PICKER
Original Filed Dec. 26, 1963   2 Sheets-Sheet 1
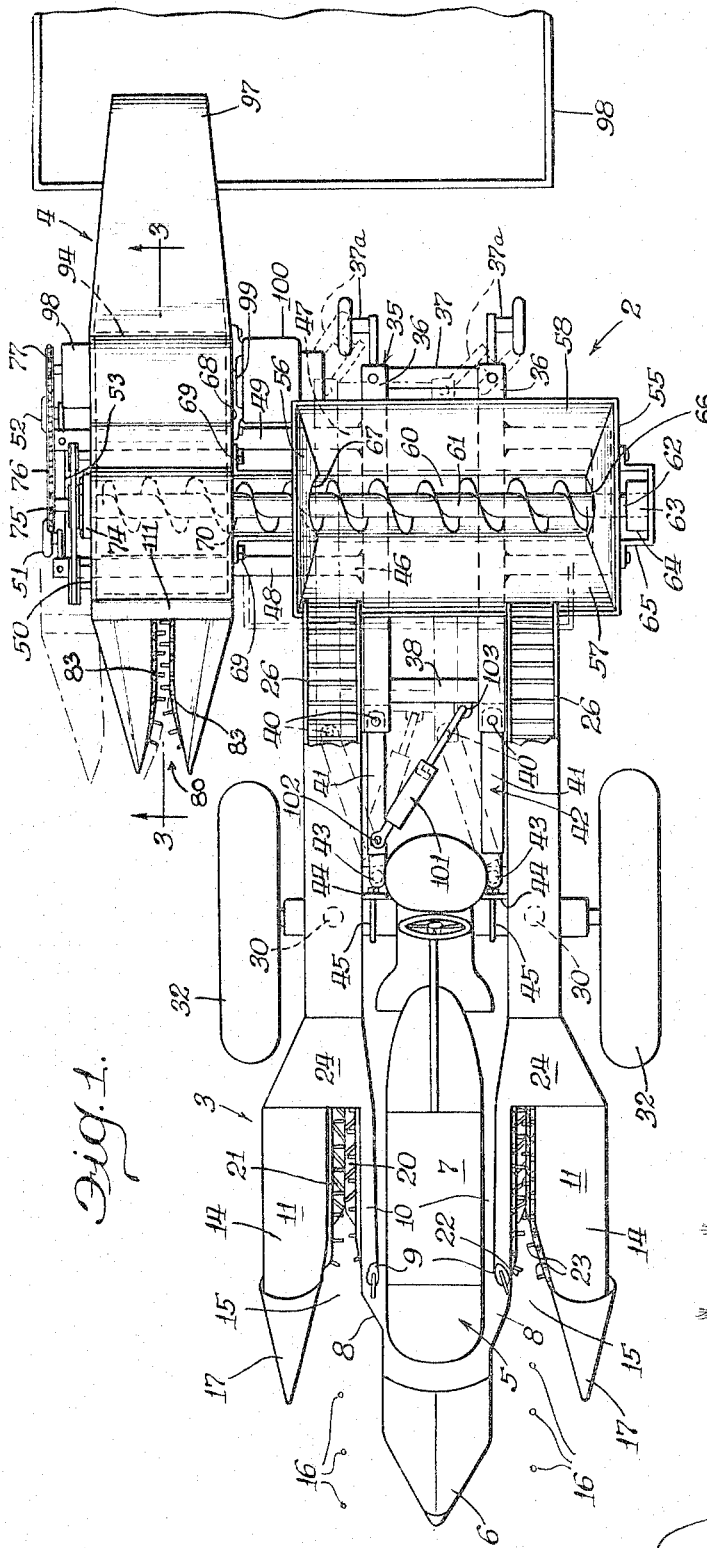
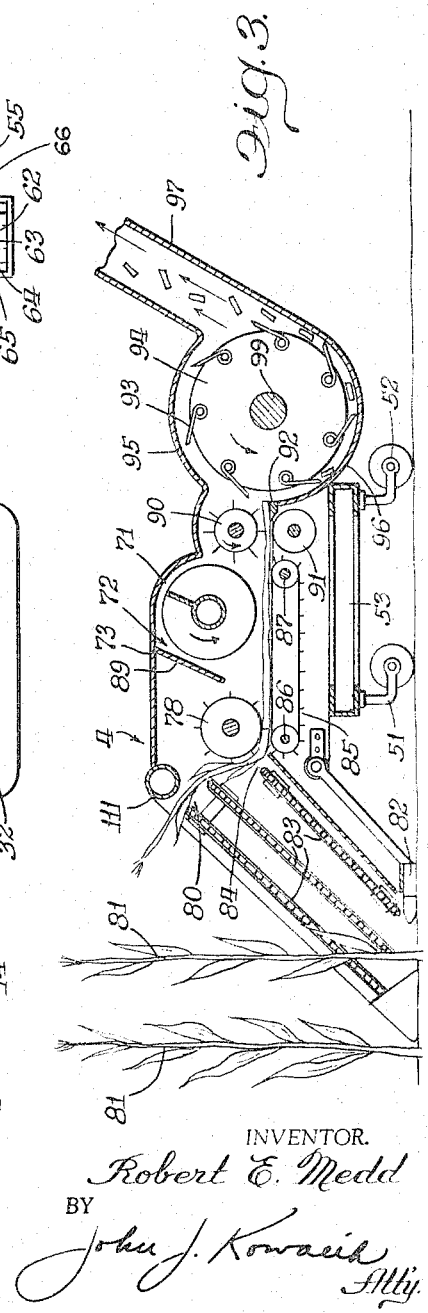
INVENTOR.
Robert E. Medd
BY
John J. Kowalik
Atty.

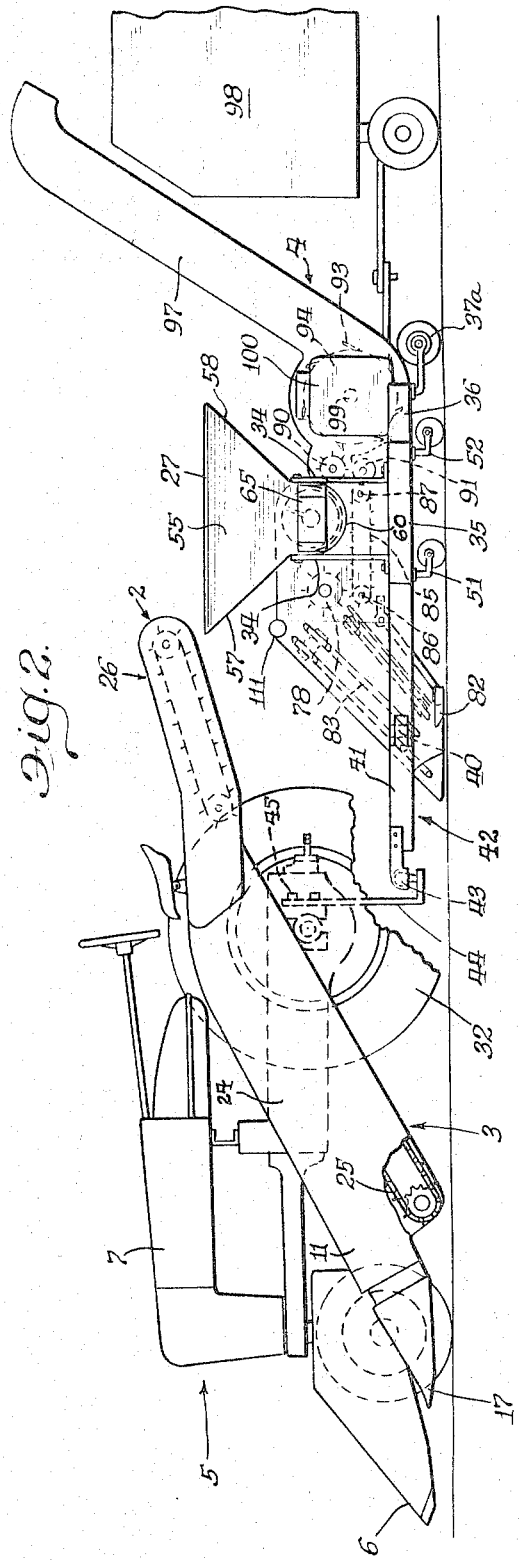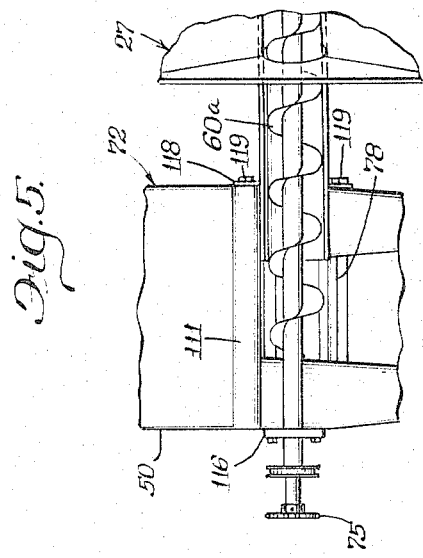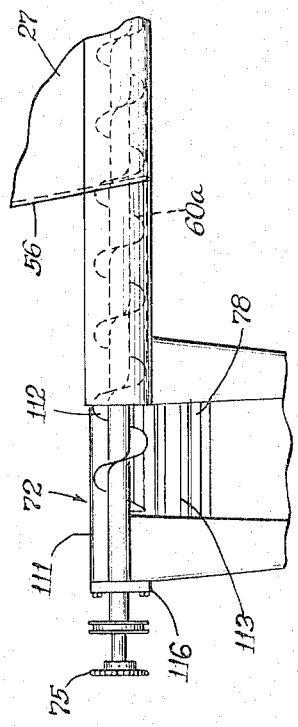

United States Patent Office 3,298,162
Patented Jan. 17, 1967

3,298,162
FORAGE HARVESTER AND CORN PICKER
Robert E. Medd, Hollandale, Minn. 56045
Continuation of application Ser. No. 333,310, Dec. 26, 1963. This application Oct. 23, 1965, Ser. No. 511,272
15 Claims. (Cl. 56—16)

This invention relates to harvesting machines and more specifically to a novel high energy feed harvester, and is a continuation of my application Serial No. 333,310, filed December 26, 1963, now abandoned.

Heretofore, attempts have been made to harvest forage crops such as corn with a machine which will harvest the entire stalk in one row and the corn from another row and these crops were then commingled and delivered into a single chopper head which cut the crops and delivered to a trailing wagon.

Such attempts required a specialized piece of machinery and in general do not obtain sufficient flexibility in the operation to become generally acceptable. The operation is restricted to a one-to-one ratio of silage to corn and since the piece of equipment is specialized it is not adaptable to processing, for example, forage which includes the stalks and the corn, etc., or to the picking of corn alone.

For optimum silo filling of forage material, the silo should be filled with a high energy feed at one end which is gradually tapered to a low energy feed such that initially the cattle is fed the low energy feed and then progressively the corn supplement is increased whereas the low energy ration is decreased. Thus the cattle is provided with feed material which builds their bulk at the time when such obtains optimum results in fattening the cattle preparatory to market. In the disclosure herein divulged the harvesting and the mixing of the appropriate feeds is performed directly in the field so that handling is minimized thereby reducing cost and materially improving the efficiency of the operation.

It is a general object of the invention to provide a novel mechanism which includes a multiple row corn harvester and a forage harvester which are adapted to be disassociated for individual operation and which are arranged to be combined in side-by-side relationship so that multiple crop harvesting operations may be accomplished as desired.

In the following disclosure the combination of the two row corn picker with a single row forage harvester is discussed. Thus it is feasible with this equipment to harvest one row of silage, or alternatively harvest one row of silage and one row of corn or further to harvest one row of silage and simultaneously rows of corn or only two rows of corn. Thus it will be seen that a farmer who has a bottom unloading silo may initially harvest only silage and stack a certain amount within the silo and then harvest one row silage and one row corn and further fill the silo to a certain level with this material and then he may harvest one row of silage and two rows of corn and further fill the silo and then finally he may disassociate the forage harvester and proceed to harvest only the corn which may be used to top off the feed.

In furtherance of the foregoing discussion it is an object of this invention to provide a novel and efficient combination forage harvester and a corn picker with a conveyor therebetween which discharges the corn into the forage harvester for chopping and mixing thereby.

A further object of the invention is to provide a novel combination forage harvester and corn picker in which portions of the machine may be selectively combined or separated and used conjunctively or independently of one another for a desired harvesting operation.

These and other objects and advantages inherent in and encompassed by the invention will become more readily apparent from the specification and the drawings wherein:

FIGURE 1 illustrates an exemplary form of one row forage harvester combined with a two row corn picker;
FIGURE 2 is a side elevational view of the structure shown in FIGURE 1;
FIGURE 3 is a longitudinal sectional view taken substantially on the lines 3—3 of FIGURE 1;
FIGURES 4 and 5 illustrate a modification. FIGURE 4 being a fragmentary front view, and FIGURE 5 being a fragmentary plan view.

Referring now to the embodiment of the invention shown in FIGURES 1 through 3 inclusive there is shown the combination forage harvester and corn picker machine generally designated 2 which includes a corn picking component generally indicated 3 and a forage component generally designated 4.

The corn picking component 3 is carried from a tractor generally designated 5 as well known to those skilled in the art and comprises a tractor mounted divider 6 which is disposed in fore-and-after alignment with the tractor body 7, the divider 6 having laterally outwardly rearwardly sloping guide portions 8 which overlap the forward extremities 9—9 of the inboard portions 10—10 of the cornheads 11—11.

The cornheads 11—11 are of conventional construction as well known to those skilled in the art and may be such as are currently sold by the International Harvester Company under the designation 2MH or 2ME corn pickers. Each cornhead 11 in addition to the inboard portion 10 comprises an outboard portion 14 and the associated portions 10, 14 define a plant passageway 15 therebetween through which pass corn stalks which are located in the rows identified by the dots 16—16.

Each outboard component 14 comprises a divider point 17 which is adapted to guide fallen or prostrated corn stalks into the plant throat 15. Each cornhead 11 comprises a pair of snapping rolls 20, 21 respectively mounted on the components 10, 14 by means of which the stalks passing between the snapping rollers 20, 21 are snapped off the stalk. The corn is positively moved rearwardly and upwardly off the snapping rollers by the chain type conveyor sweeps 22, 23 which are carried on the respective conponents 10, 14. Corn is then delivered rearwardly into an elongated upwardly and rearwardly extending housing 24 whereat it is delivered to the conveyor 25 which extends to adjacent the rear end of the housing 24 where the corn is delivered to a conveyor 26 which discharges the corn into a trough 27. The trough 27 is wide enough transversely of the tractor to receive from both discharging conveyors 26 which extend from the housings 24, the housings 24 being suitably secured as by mountings 30—30 to the rear axle 31 of the tractor between the wheels 32 thereof.

The trough 27 is suitably supported by means of braces 34 from a frame-work 35 which may have longitudinal fore-and-aft extending beam portions 36—36 inter-connected by transverse front and rear braces 37, 38. The rearward end of the frame 35 is supported by caster wheel means 37a and the forward ends of the beam members 36 project forwardly of the beam member 38 and are pivotally connected on substantially vertical axes means of pins 40—40 to the rearward ends of fore-and-aft extending draft links 41—41 of a hitch frame structure generally designated 42. The forward ends of the links 41 may be pivotally connected as by means of ball joints 43 to brackets 44 which are suitably connected by U-bolts 45 to the rear axle portions 31 of the rear axle structure.

One of the beams 36 is connected to the inboard ends 46 and 47 in front and rear lateral extension beams 48, 49 of the frame 35 said beams extending beyond the outboard side wall 50 of the forage harvester component 4 and being supported by caster wheels 51 and 52 at the juncture with the outboard beam 53.

The forage harvester is fed from the trough 27 which has downwardly sloping ends 55, 56 and sides 57, 58 which converge into a U-shaped auger bottom 60 which encloses the auger 61, said auger having its core portion 62 journalled as at 63 from a bearing 64 which is mounted on a bracket 65 connected to the wall 55. The core 62 extends through an opening 66 in the wall portion 55 and the entire auger extends through an opening 67 in the wall 56, within the auger bottom which extend from the wall 56 to the inboard sidewall 68 of the forage harvester component 4 and is secured thereto as by bolts 69. The auger 60 continues through an opening 70 in the wall 68 and extends through the chamber 71 of the forage harvesting housing 72 which housing comprises a top wall 73 and the afore-mentioned inboard wall 68 and the outboard wall 50. The auger core may be journalled on a bearing 74 on the outboard wall 50 of the forage harvester housing and may extend outwardly of the wall 50 and be provided with a sprocket 75 which may be suitably driven by chains and the like 76 from the output of the gear box generally designated 77 which may serve also as a source of connection of power to the forward feed roll 78 which is journalled between the side walls 50, 68 of the chamber or housing 72 within the chamber 71 which has its forward end in receiving relation to the row crop harvesting unit or crop harvesting head 80 which may be any well known type as well known to those skilled in the art in which may be of the type shown and currently marketed by the International Harvester Company as the Nos. 50 or 16 Forage Harvester.

It will be realized that the plants which include the corn stalks identified as 81 (FIGURE 3) are adapted to be cut by the sickle 82 and advanced upwardly by means of conveying chains and the like 83 to the intake 84 whereat the feed roll 78 is adapted to lay the material and advance it onto the conveying means 85 which in the present instance is shown to be a slat-bar conveyor carried on the rollers 86, 87 between the sidewalls 50, 68 of the housing portion 72 and forming the bottom thereof. It will be seen that the auger in the present embodiment is located rearwardly of the metering roller 78 behind the baffle 89 and that the material is continuously being advanced by the feed roll 78 and by the auger 68 into the metering rolls 90, 91 which feed rearwardly over the ledger bar 92 for cutting action by the blades 93 of the chopper-head 94 which is enclosed within a generally cylindrical housing portion 95, the cutterhead 94 chopping material downwardly and moving it along the bottom sector 96 of the housing 95 into a tangentially extending discharge chute 97 whereat the material is discharged into a trailing wagon 98 as well known to those skilled in the art. It will be realized that the drives for the various components are shown as emanating from the gear box 98 which is disclosed as being at one end of shaft 99 of the rotor or chopper which is driven at its other end by the engine 100, or tractor power take-off shaft.

It will become readily understood that the forage harvester is adapted to be operated with the corn pickers and that to provide for an adjustment for row widths between 28 to 40 inches, the forage harvester is capable of being adjusted laterally by means of hydraulic cylinder 101 which is pivoted as at 102 to one of the links 41 and at its other end it is pivoted as at 103 to the front member 38 diagonally across one of the pivots 40. Extension and compression of the cylinder 101 will effect lateral displacement of the hitch structure with attendant lateral movement of the forage harvester which is pivotally supported on the caster wheel structures.

It will be understood that if desired one row of silage may be picked or harvested by the forage harvester and the two pickers would be running in the open field. At a later stage of harvesting one of the corn heads and the forage harvester may be operated to harvest 2 rows and in still later stages the three rows may be harvested, the innermost row being harvested by the forage harvester and the two outer rows by the two corn harvesting units. If it is desired to operate the forage harvester independently, the corn harvesters may be readily removed as is well known to those skilled in the art, and the forage harvester alone used. If desired, the forage harvester may be removed by disconnecting the ball joint connections or by freeing it from the hitch members and the corn harvester may be used separately and the discharging elevators may discharge directly into the trailing wagon which may be hitched to the rear axle in any convenient manner as well known to those skilled in the art.

Thus it will be realized that various combinations of the instant harvesting machine may be effected and the combination minimizes the need for making special individualized equipment for various harvesting procedures. In other words a substantially conventional forage harvester may be provided and a substantially conventional corn harvester may be utilized and the same may be used either individually or conjunctively and the conjoining mechanism combines the two machines into compatible components to function as a single unit.

In the embodiment of the invention shown in FIGURES 1 through 3 the auger was shown as being disposed behind the feed roller 78. It will be understood that as shown in FIGURES 4 and 5 the feed auger which is identified at 60a may feed into the plant throat area 84 of the forage harvester component 4 ahead of the chamber structures 72 in back of the plant deflector 111, FIGURES 1 and 2 and FIGURES 4 and 5. The auger 61a may have its flights 112 exposed the width of the plant passage 113 at the front end of the chamber 72 and may serve in rotating in the direction of the arrow with a downward, forward movement as an additional means for moving the stalks into the chamber 72 beneath the feed wheel 78. At the same time the auger 60a would be feeding and discharging the corn ears over this extensive area onto the incoming forage. In the present embodiment the outboard end of the core may be journalled on the bearing 115 which may be suitably carried on a bracket 116 mounted on the outboard wall 50 of the chamber structure 72 and driven by sprocket 75. The auger trough may be provided with a bracket 118 which may be bolted as by bolts 119 to the inboard wall 68 of the chamber structure 72.

Having described several embodiments of the invention, it will be realized that in view of the foregoing disclosures various other forms of the invention will become readily apparent to those skilled in the art within the scope of the appended claims.

I claim:

1. In a harvesting machine, the combination of corn harvester having a conveyor with a discharge end, an ambulatory support therefor, a forage harvester adjustably mounted to said ambulatory support for movement laterally with respect to said corn harvester for adjustment with respect to varying row widths, a trough carried from the support beneath said conveyor discharge end, an auger extending from the trough to said forage harvester, said forage harvester having a gathering head and a conveying housing extending rearwardly from said gathering head, and said auger having a discharge end delivering to said housing.

2. The invention according to claim 1 and said housing having a forward end defining a plant tunnel behind the gathering head and said auger extending across said tunnel and presenting a crop-engaging area for sweeping the crops through said housing.

3. The invention according to claim 1 and said housing having a forward end defining a plant tunnel behind the gathering head and said auger extending across said tunnel and presenting a crop-engaging area for sweeping the crops through said housing, and said auger disposed in front of said housing.

4. The invention according to claim 1 and said housing having a forward end defining a plant tunnel behind the gathering head and said auger extending across said tunnel and presenting a crop-engaging area for sweeping the crops through said housing, a gathering roller in the housing adjacent to the front end of the housing, and said auger disposed behind said gathering roller.

5. In a harvesting machine, a supporting means, first and second harvesting components operatively associated therewith, the first harvesting component comprising a corn harvesting device, means detachably associated with said harvesting components and said means disposed to deliver harvested corn from the first component to said second harvesting component; means detachably mounting said second harvesting component to said supporting means; said second component further comprising a chopper disposed to receive crops from both of said components and comminute the aggregate of the crops from both components.

6. In a harvesting machine according to claim 5 wherein said second component comprises a forage harvesting device for processing an entire plant and said corn harvesting device comprises a multirow unit positionable to harvest selected rows of corn at the option of an operator to vary the proportion of corn to forage in the aggregate.

7. The invention according to claim 5 and said means detachably mounting said second harvesting component including means for positioning said components varying lateral distances apart in accordance with selected row plantings of crops which the harvesting machine is to harvest.

8. The invention according to claim 5 and said first and second components being independently operable and said corn harvesting device comprising a cornhead having a pair of laterally spaced portions defining a stalk passage therebetween, snapping roller means mounted on at least one of said portions along the passage for snapping corn off the stalks, conveying means extending upwardly and rearwardly from the stalk passage and operative to carry the corn from the snapping roller means upwardly and rearwardly therefrom and having an elevated discharge, said means for delivering corn from the first component to the second component comprising a conveyor underposed with respect to said conveying means for receiving corn from said discharge, said conveyor extending transversely of the direction of movement of said harvesting machine and bridging the space between said components, said components being laterally aligned.

9. The invention according to claim 8 and said second component being a forage harvester and having a pair of laterally spaced portions defining a plant passage therebetween and having a sickle across the passage for cutting the stalks at their butt ends and having gathering chains along the plant passage for moving the cut stalks rearwardly, means for moving the cut stalks from the plant passage and disposed to receive and move the corn from said conveyor to said chopper.

10. The invention according to claim 5 and said harvesting components being disposed transversely of the direction of movement of the harvesting machine, and said means disposed to deliver harvested corn from the first to the second component bridging the same.

11. In a harvesting machine, the combination of a corn harvester having a corn picker with a discharge end, an ambulatory support therefor, a forage harvester positioned alongside the corn harvester and adjustably mounted to said ambulatory support for movement laterally with respect to the corn harvester for adjustment with respect to varying row widths of the crops, a transition conveyor carried from the support between said corn harvester and said forage harvester, and said forage harvester having a gathering head, and means for conveying crops from the gathering head rearwardly, and said transition conveyor having a receiving end cooperatively disposed to receive corn from said corn harvester and having a delivery end discharging corn into said last-mentioned means, and means for processing said crops operatively associated with said last-mentioned means.

12. In a harvesting machine, a supporting means, a first harvesting device, a second diverse harvesting device optionally operatively associated therewith, the first harvesting device comprising a corn harvesting means and having discharge means, said second harvesting device comprising a forage harvester and being optionally operatively connectible with said first harvesting device.

13. The invention according to claim 12 and common processing means optionally operatively associated with said devices.

14. The invention according to claim 12 and means operatively associated with said devices for optionally aggregating the crops harvested by said devices.

15. The invention according to claim 12 and means operatively connected to said forage harvester for chopping the plant.

References Cited by the Examiner

UNITED STATES PATENTS

| | | | |
|---|---|---|---|
| 2,333,901 | 11/1943 | Swenson | 56—16 X |
| 2,787,878 | 4/1957 | Hadley | 56—18 |
| 2,843,992 | 7/1958 | Jones | 56—18 X |
| 3,000,164 | 9/1961 | Kiecker | 56—16 |

ABRAHAM G. STONE, *Primary Examiner.*

ANTONIO F. GUIDA, *Examiner.*